United States Patent [19]

Alas et al.

[11] Patent Number: 4,570,772
[45] Date of Patent: Feb. 18, 1986

[54] CLUTCH WITH REACTION PLATE IN TWO PARTS, ESPECIALLY FOR MOTOR VEHICLES

[75] Inventors: Jacques Alas, Enghien; Michel Bacher, Domont, both of France

[73] Assignee: Valeo, Paris, France

[21] Appl. No.: 577,779

[22] Filed: Feb. 7, 1984

[30] Foreign Application Priority Data

Feb. 8, 1983 [FR] France .................... 83 01934

[51] Int. Cl.[4] .............................................. F16D 13/18
[52] U.S. Cl. ........................... 192/70.18; 192/70.13; 192/70.11; 192/66
[58] Field of Search ............... 192/66, 70.11, 70.13, 192/70.17, 70.18, 70.2

[56] References Cited

U.S. PATENT DOCUMENTS

| | | | |
|---|---|---|---|
| 1,562,144 | 11/1925 | Burns | 192/70.17 |
| 2,165,670 | 7/1939 | Wales | 192/70.18 |
| 2,694,478 | 11/1954 | Zeidler | 192/70.18 |
| 3,118,526 | 1/1964 | Wolfram | 192/70.18 |
| 3,254,747 | 7/1966 | Werner | 192/98 |
| 3,583,537 | 8/1971 | Spannagel | 192/70.13 |
| 3,666,062 | 5/1972 | Riese | 192/70.2 |

FOREIGN PATENT DOCUMENTS 2116423 10/1972 Fed. Rep. of Germany .
1383332 11/1964 France .
1594908 7/1970 France .

Primary Examiner—Alan Cohan
Assistant Examiner—John A. Rivell
Attorney, Agent, or Firm—Charles A. Brown; Charles E. Brown

[57] ABSTRACT

A clutch comprises a transversely disposed reaction plate assembly. This is designed to be fixed in rotation to a shaft, in practice a drive shaft. At its outer periphery, on an axial rim, it has a toothed starter ring. The reaction plate assembly is in two parts fastened together, a support bracket and a reaction element. The support bracket is stamped out from sheet metal, the axial rim and the toothed starter ring forming integral parts of the support bracket. The toothed ring is formed by stamping the axial rim.

5 Claims, 4 Drawing Figures

FIG. 2
FIG. 3
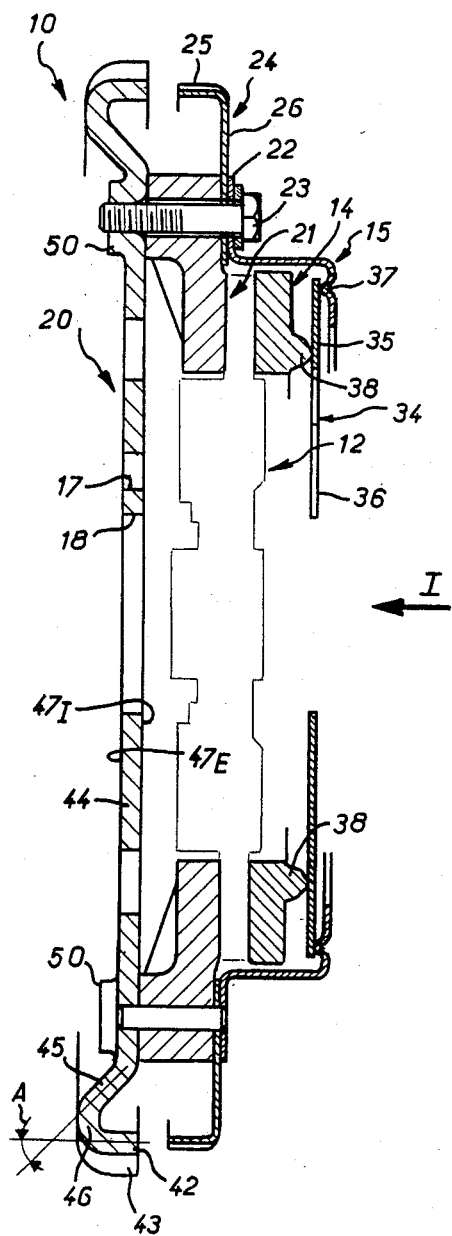
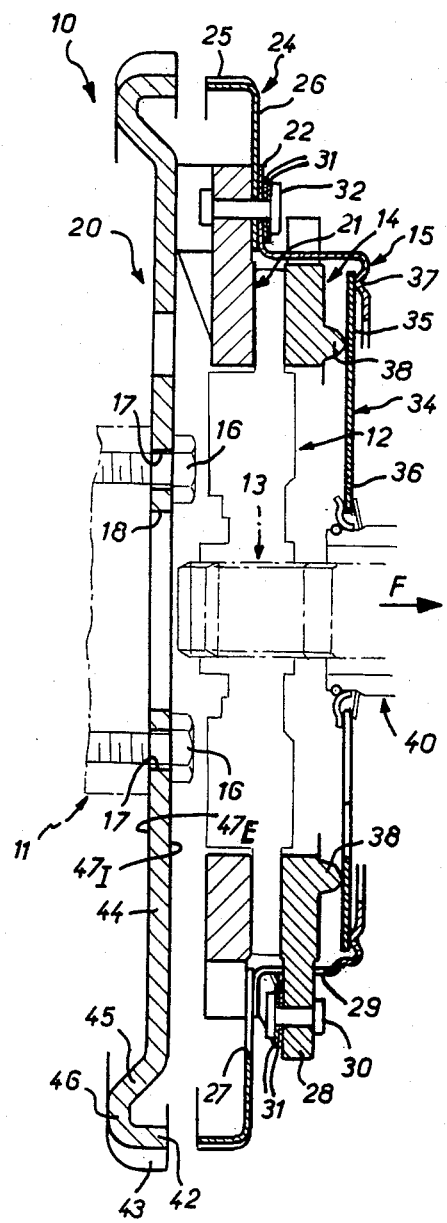

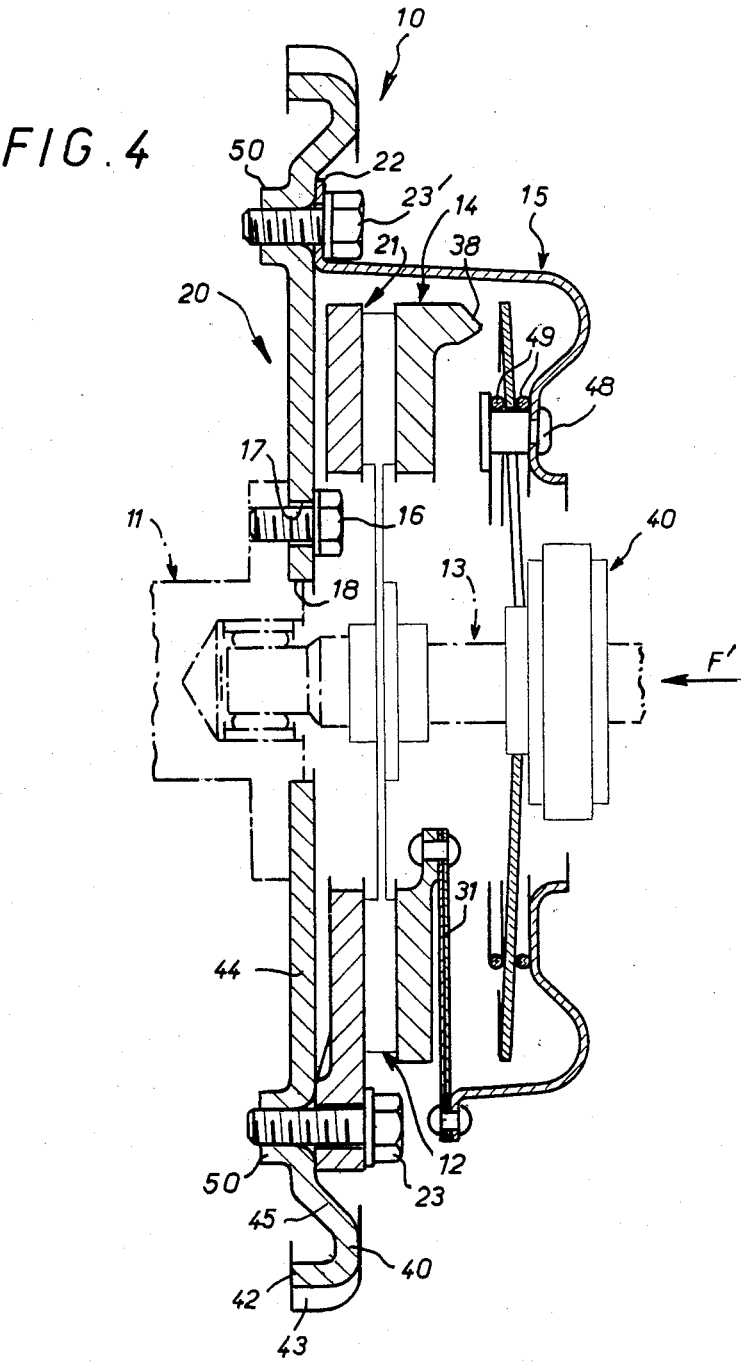

CLUTCH WITH REACTION PLATE IN TWO PARTS, ESPECIALLY FOR MOTOR VEHICLES

BACKGROUND OF THE INVENTION

1. Field of the Invention

The present invention relates, in general terms, to clutches of the kind conventionally used for equipping motor vehicles.

2. Summary of the Prior Art

As is known, such a clutch substantially comprises, transversely, a first plate, commonly called a reaction plate or flywheel, intended to be fixed in rotation to a first shaft, in practice a drive shaft such as the output shaft of the engine in the case of a motor vehicle, a friction disk intended to be fixed in rotation to a second shaft, in practice a driven shaft such as the input shaft of a gearbox in the case of a motor vehicle, a second plate, commonly called a pressure plate, fixed in rotation to the reaction plate whilst being movable axially in relation to the latter, a component, called a cover, fixed in rotation to the reaction plate and coupled to the latter in the axial direction, and elastic means which, bearing on the cover, are designed to continuously stress the pressure plate towards the reaction plate so as to clamp the friction disk axially between said plates.

The reaction plate may be a generally flat component, in which case, in order to define the volume required to accomodate the friction disk and its movement, the pressure plate and the elastic clamping means associated with the latter, the cover is itself generally bell-shaped.

Alternatively, the opposite arrangement may be adopted, the reaction plate itself having on its inner periphery an axial rim adapted to define said volume, in which case the cover is generally flat.

As is also known, a clutch is usually equipped with a toothed starter ring.

More often than not, this toothed ring is carried directly by the reaction plate, either being integral with the latter or consisting of a component separate from said reaction plate, and formed for example by appropriately rolling to a circular configuration an initially straight bar, which is then appropriately attached to the reaction plate.

In practice, the toothed starter ring is more often than not an integral part of the reaction plate only when, the latter being generally flat, it may be very readily formed on the edge of the reaction plate.

Its axial dimension is then necessarily limited.

A general objective of the present invention is to provide an arrangement whereby it may be given any required axial dimension, taking beneficial advantage of the arrangement in which, as described for example in U.S. patent application Ser. No. 489,531 filed Apr. 28, 1983, the reaction plate is an assembly formed by two separate parts appropriately fastened together, consisting of a supporting bracket, by means of which it may be fixed to the shaft in question, and a reaction element with which the friction disk can interact.

SUMMARY OF THE INVENTION

The present invention consists in a clutch comprising a transversely disposed reaction plate assembly consisting of a support bracket of unitary construction and formed by a metal stamping having on its outer periphery an axial rim stamped to constitute a toothed starter ring, by means of which it is adapted to be constrained to rotate with a driven shaft, and a reaction element fastened to said support bracket.

The advantageous result of this is a reduction in the fabrication cost of the assembly.

The support bracket preferably has an intermediate part linking said axial rim thereon to the remainder thereof which is generally oblique to the axis of the clutch and at an angle of less than 90° to said axial rim.

By virtue of a configuration of this kind the axial rim carrying the toothed starter ring is highly rigid, ensuring that it will remain centered on the axis of the assembly.

The intermediate part of the support bracket preferably projects in the axial direction from one side of the support bracket and the axial rim preferably extends in the axial direction at least as far as the other side of the support bracket.

The result of this is that, in spite of it possibly having a relatively large axial dimension, the useful part of the toothed starter ring may still and with advantage be transversely centered on the median plane of the support bracket which carries it, which is favorable to the correct absorption by this support bracket, without deformation, of the driving torque to which the toothed starter ring is subjected when the associated starter motor is used, and effective transmission of this torque by the support bracket to the shaft to which it is fixed.

Other objects and advantages will appear from the following description of examples of the invention, when considered in connection with the accompanying drawings, and the novel features will be particularly pointed out in the appended claims.

BRIEF DESCRIPTION OF THE DRAWINGS

FIGS. 2 and 3 are views of it in axial cross-section on the respective broken lines II—II and III—III in FIG. 1.

FIG. 4 is a view analogous to that of FIG. 2 and concerning an alternative embodiment.

DESCRIPTION OF THE PREFERRED EMBODIMENTS

Figure 1:
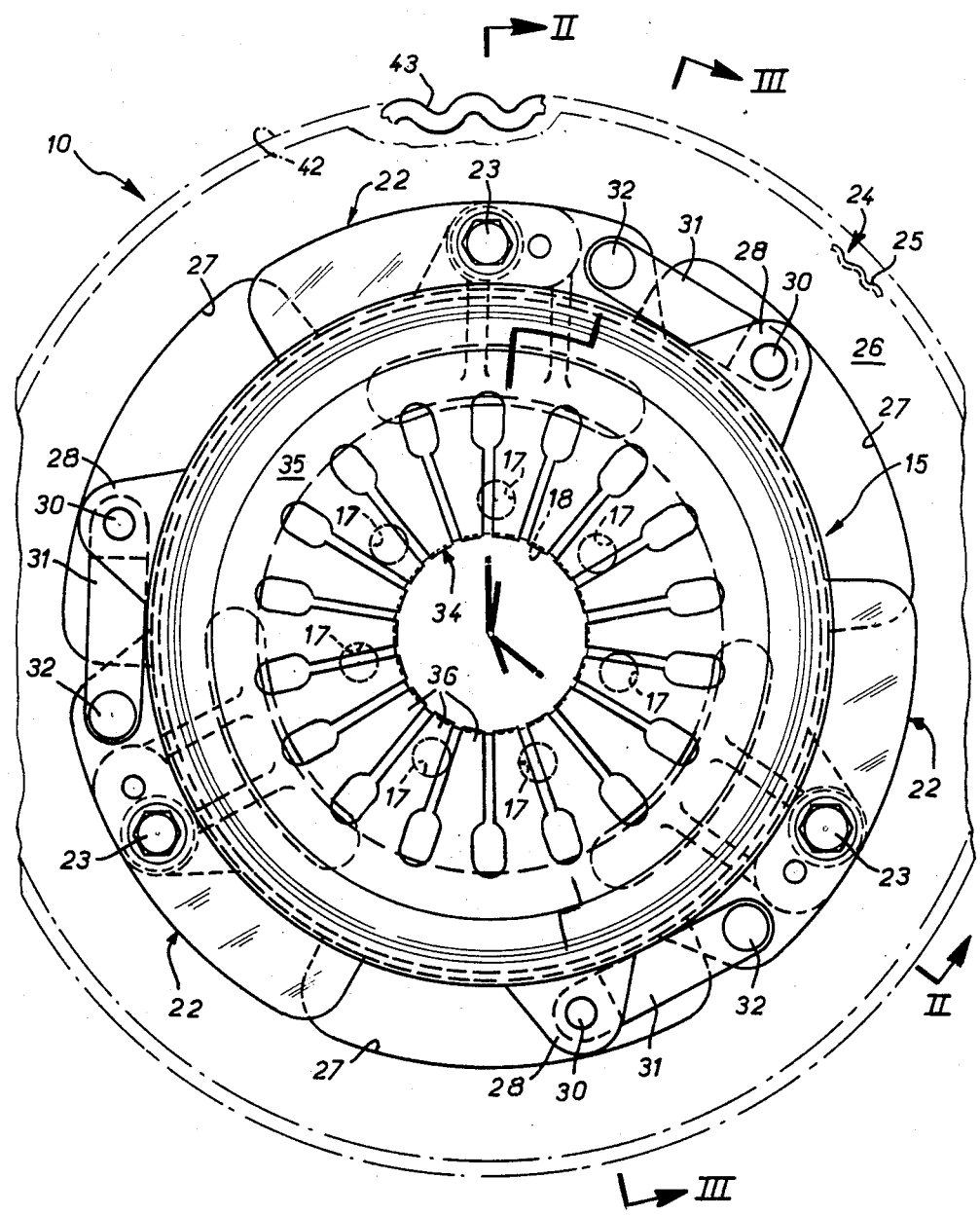
FIG. 1 is a partial and partially cutaway plan view of a clutch in accordance with the invention, seen in the direction of the arrow I in FIG. 2.

Substantially, and as illustrated in these figures, a clutch in accordance with the invention comprises, transversely and axially in succession, and in a way known per se, a first plate 10, commonly called a reaction plate or flywheel, intended to be fixed in rotation to a first shaft 11 indicated by chain-dotted lines in FIGS. 3 and 4, a friction disk 12 intended to be fixed in rotation to a second shaft 13, also indicated by chain-dotted lines in FIGS. 3 and 4, and only the contour of which is shown in the figures, in thin line, a second plate 14, called a pressure plate, fixed in rotation to the reaction plate 10 whilst being movable axially in relation to the latter, and a component 15, called a cover, fixed in rotation to the reaction plate 10 and connected axially to the latter and cooperating with elastic means which, bearing on the cover 15, are designed to stress the pressure plate 14 continually towards the reaction plate 10 so as to clamp the friction disk 12 between said pressure plate 14 and said reaction plate 10.

In practice, the shaft 11 is a drive shaft.

Since a clutch for a motor vehicle is concerned here, this is the crankshaft of the engine of the vehicle.

As shown in FIGS. 3 and 4 the reaction plate 10 may be fastened to the shaft 11 by means of screws 16, for example, the reaction plate 10 having for this purpose at its inner periphery spaced holes 17 adapted to have screws 16 of this kind passed through them, for preference equi-angularly distributed around its central opening 18, as shown here.

In the embodiments shown, the reaction plate 10 is an assembly of two separate parts appropriately fastened together, as will be described hereinafter, consisting of a support bracket 20 by means of which it may be fixed to the shaft 11 concerned, the aforementioned holes 17 being formed in the support bracket 20, and also a reaction element 21 with which the associated friction disk 12 can interact.

In the embodiments shown, the main part of the support bracket 20 constitutes a tranverse flange.

In practice, this support bracket 20 and the reaction element 21 are components of annular configuration.

The cover 15 is also a component of annular configuration.

At its outer periphery it has a rim 22 projecting radially outwards by means of which it is fixed to the reaction plate 10, thus being fixed in rotation to the latter and connected axially to it.

In the embodiment shown in FIGS. 1 to 3 and for reasons which, not being relevant to the present invention, will not be described in detail here, this radial rim 22 on the cover 15 is subdivided circumferentially into three equi-angularly spaced sections.

Also, in this embodiment, the fastening means attaching the cover 15 to the reaction plate 10 consist of screws 23 which also join together the two component parts of the reaction plate assembly 10.

In other words, these screws 23 also and of themselves attach together the support bracket 20 and the reaction element 21 constituting the reaction plate assembly 10.

In the embodiment shown in FIGS. 1 to 3, an ignition target 24 with teeth 25 has a radially inwardly extending flange 26 disposed between the reaction plate assembly 10 and the radial rim 22 on the cover 15, so that it is attached to the assembly by the same screws 23.

In practice, in the embodiment shown, the flange 26 of the ignition target 24 has at its inner periphery spaced notches 27 alternating with the sections of the radial rim 22 of the cover 15.

Being well known per se and not constituting part of the present invention, the friction disk 12 will not be described in detail here.

As suggested by its outline in FIGS. 2 and 3, it may consist of a damper hub type friction disk, for example.

Like the reaction plate assembly 10 and the cover 15, the pressure plate 14 is a component of generally annular configuration.

In the embodiment shown in FIGS. 1 to 3 it has spaced radially outwardly projecting lugs 28, in a way known per se, which pass radially through the lateral wall of the cover 15 by means of notches 29 formed in the latter between the sections of its radial rim 22 and appropriately extended on said lateral wall and by means of which it is attached by rivets 30 to elastically deformable tabs 31 which extend generally tangentially to a circumference of the assembly and which, at their other ends, are attached by rivets 32 to said sections of the radial rim 22 of the cover 15 and to the reaction plate assembly 10, said rivets 32 conjointly affecting, in addition to the elastically deformable tabs 31 and the sections of the radial rim 22 of the cover 15, the radial flange 26 of the ignition target 24 and the reaction element 21 of said reaction plate assembly 10.

The pressure plate 14 is thus fixed in rotation to the reaction plate 10 whilst being movable axially relative thereto.

In the embodiment shown, the elastic means acting on the pressure plate 10 consist of an annular component 34, called a diaphragm spring, having a peripheral part forming a Belleville spring washer 35 and a central part subdivided into radial fingers 36.

In the embodiment shown in FIGS. 1 to 3, the outer periphery of this diaphragm spring 34 forming the Belleville spring washer bears on the cover 15, by means of an annular boss 37 projecting axially from the latter for this purpose. It bears on the pressure plate 14 by means of an annular bead 38 also projecting axially for this purpose from the cover 15, and possibly subdivided in the circumferential direction.

Through the ends of its radial fingers 36, the diaphragm spring 34 is adapted to be acted on by a clutch release bearing 40, indicated in chain-dotted line in FIG. 3.

In the embodiment shown, this is a clutch release bearing adapted to operate in traction, that is to say in the direction away from the reaction plate assembly 10, as indicated by the arrow F in FIG. 3, the diameter of the circumference around which the bead 37 on the cover 15 extends being greater than that of the circumference around which the bead 38 on the pressure plate 14 extends.

As the clutch release bearing 40 does not constitute part of the present invention, it will not be described here.

In a way generally known per se, the reaction plate assembly 10 has at its outer periphery an axial rim 42 and there is associated with it a toothed starter ring 43 which forms an integral part of it and is formed on the outside flank of its axial rim 42.

In accordance with invention, the axial rim 42 and the toothed starter ring 43 are carried by the support bracket 20 which forms one of the component parts of the reaction plate assembly 10. The support bracket 20 is an appropriately stamped sheet of metal and of unitary construction from its outer periphery to its inner periphery, the toothed starter ring 43 being formed by stamping the axial rim 42 on which it is formed.

In other words, the toothed starter ring 43 is stamped into the axial rim 42 of the support bracket 20.

For preference, and as shown here, the axial rim 42 of the support member 20 is linked to the transverse main part 44 of the latter by an intermediate part 45 which is generally oblique to the axis of the assembly and at an angle A to said axial rim 42 of less than 90°.

It will be understood that this intermediate part 45 and the axial rim 42 are in practice linked by a generally rounded connecting bend 46 which may even comprise a part which is transverse to the axis of the assembly.

In practice also, the intermediate part 45 projects in the axial direction from one side of the support bracket 20 and the axial rim 22 extends in the axial direction at least as far as the other side of the latter.

In the embodiment shown in FIGS. 1 to 3, the intermediate part 45 thus projects in the axial direction from the outside surface $47_E$ of the support bracket 20 and the axial rim 42, which extends in the direction towards the cover 15, extends in the axial direction to a point in line with the inner surface $47_I$ of said support bracket 20.

The opposite arrangement is adopted in the embodiment shown in FIG. 4.

In the latter, the axial rim 42 of the support bracket 20 constituting one of the component parts of the reaction plate assembly 10 extends in the axial direction away from the cover 15.

Also, in this embodiment, no ignition target is provided and the cover 15 is attached to the reaction plate assembly 10, more precisely to the support bracket 20 which the latter comprises, by screws 23' separate from those 23 attaching the reaction element 21 to the support bracket 20 with which it is associated.

Moreover, in this embodiment, the friction disk 12 is a simple disk with no damper hub, the elastically deformable tabs 31 coupling the pressure plate 14 to the cover 15 extending substantially radially, and the diaphragm spring 34 is coupled to the cover 15 by pegs 48, being flanked on each side by rings 49 adapted to permit it to tilt relative to said cover 15.

Finally, in this embodiment, the clutch release bearing 40 is adapted to operate in thrust, that is to say in the direction towards the reaction plate assembly 10, as indicated by the arrow F', the diameter of the circumference along which are disposed the pegs 48 connecting the diaphragm spring 34 to the cover being less than that of the circumference along which extends the bead 38 on the pressure plate 14 on which the diaphragm spring 34 bears.

Be this as it may, in both cases the inherent high rigidity of the axial rim 42 of the support bracket 20 provides for stamping out from the main part 44 of the latter tubular bosses 50 adapted to receive the screws 23 or 23' attaching to it the cover 15 and/or the reaction element 21, without this being prejudicial to the proper geometry of the axial rim 42. Extending in the axial direction, these bosses 50 provide the advantage of increasing the thickness of said support bracket 20 into which said screws are screwed or, other things being equal, of making it possible for the support bracket 20 to be of minimum thickness.

Also, the oblique intermediate area 45 linking the axial rim 42 on the support bracket 20 to the main part 44 of the latter has the advantage of minimizing the effect on this axial rim 42 of the heat generated in the central space of the assembly, in particular by forming a screen.

It will be understood that various changes in the details, materials and arrangements of parts, which have been herein described and illustrated in order to explain the nature of the invention, may be made by those skilled in the art within the principle and scope of the invention as expressed in the appended claims.

For example, although in the embodiments shown the support bracket forming one of the component parts of the reaction plate assembly consists at least in its main part of a transverse flange, being generally flat, this is not necessarily the case, and this support bracket can be of more complex shape, the term "flange" being interpreted in the broadest possible sense.

There is claimed:

1. A reaction plate assembly for a friction clutch, said reaction plate assembly having an axis and comprising two parts including a one-piece support bracket in the form of a sheet metal stamping including a radially extending central portion having means for securement to a driving shaft and an axial rim defining a toothed starter ring for rotating said support bracket; a separate reaction element for engaging a clutch plate in clamping reaction; and means for rigidly fixing said reaction element to said support bracket.

2. A reaction plate assembly according to claim 1, wherein said support bracket further comprises an intermediate part connecting said axial rim to said central portion, said intermediate part being oblique with respect to the axis of the reaction plate assembly and being at an acute angle to said axial rim.

3. A reaction plate assembly according to claim 2, wherein said intermediate part projects axially beyond one side of said central portion and said axial rim extends axially from said intermediate part in the opposite direction at least to the side of said central portion remote from said intermediate part.

4. A reaction plate assembly according to claim 2, wherein said intermediate part is generally frustoconical and projects axially beyond one side of said central portion, and said axial rim is generally cylindrical and extends from a radially outer end of said intermediate part at least to the opposite side of said central portion.

5. A reaction plate assembly according to claim 1, wherein said fixing means are in the form of threaded fasteners, said support bracket further includes an intermediate part interconnecting said central portion and said axial rim, a plurality of axial bushes disposed radially inwardly of the intermediate part for selectively receiving said fixing means threaded fasteners and other threaded fasteners for securing a clutch cover to the reaction plate.

* * * * *